May 6, 1958 W. G. PANKONIN 2,832,959
STAPLING DEVICE
Filed Aug. 25, 1955 4 Sheets-Sheet 1
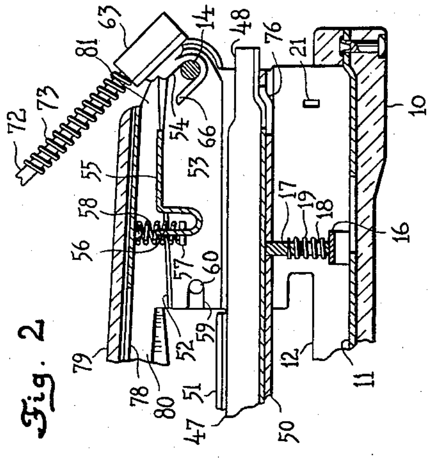
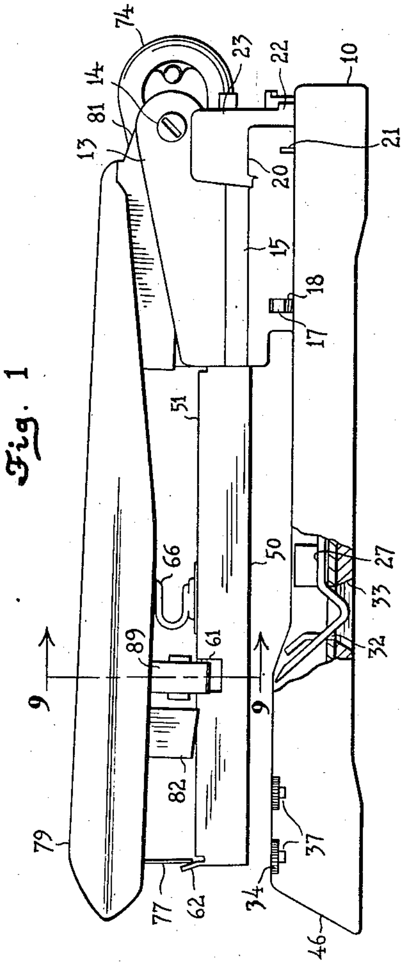
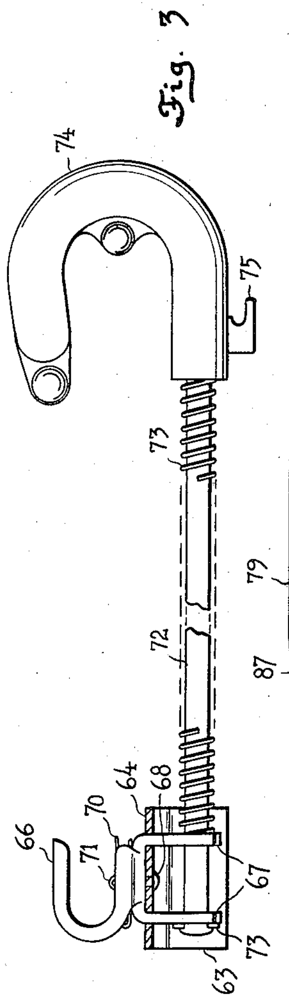
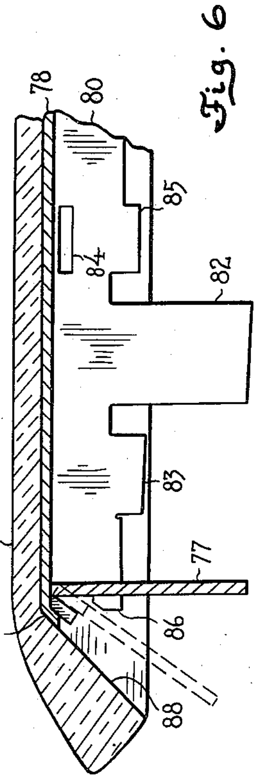
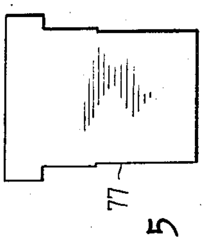
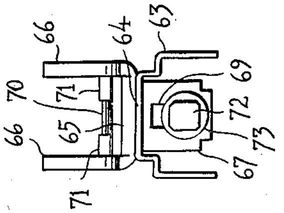
Fig. 4
INVENTOR:
William G. Pankonin
by John W. Michael
Attorney INVENTOR:
William G. Pankonin
by John W. Michael
Attorney

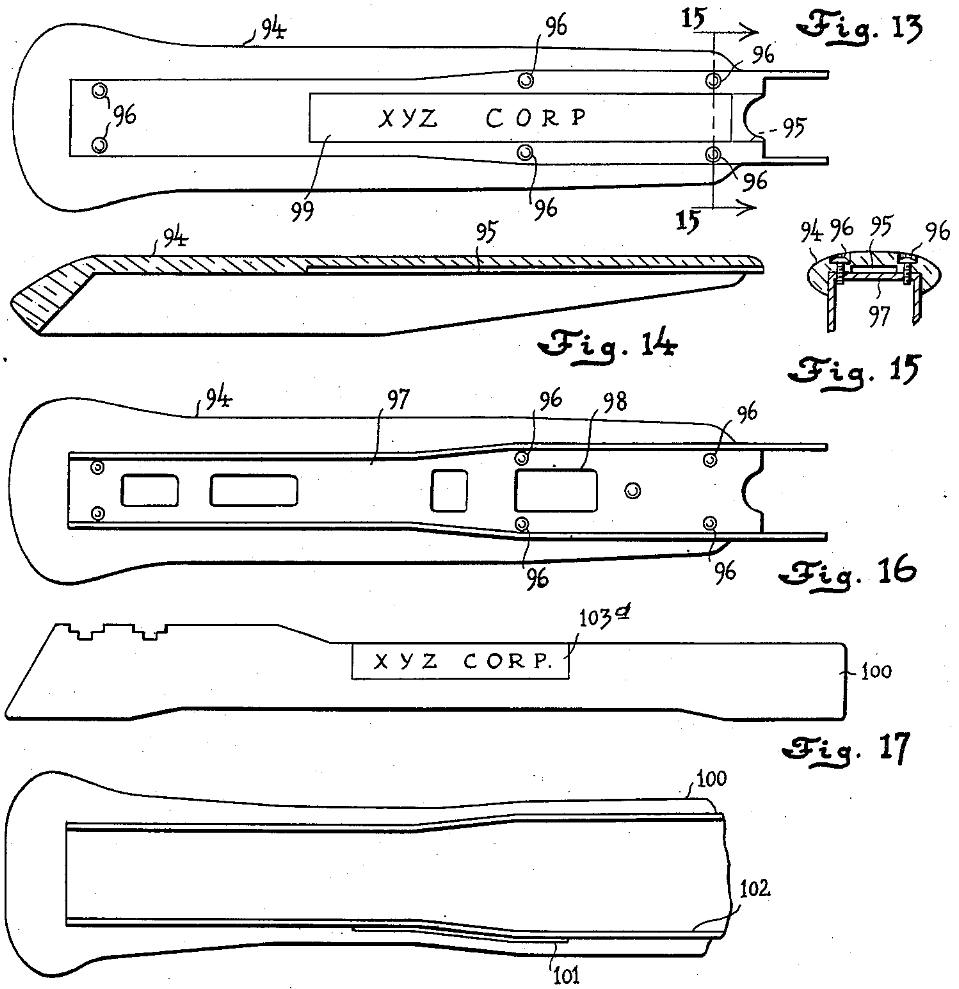
Fig. 13, Fig. 14, Fig. 15, Fig. 16, Fig. 17
Fig. 18
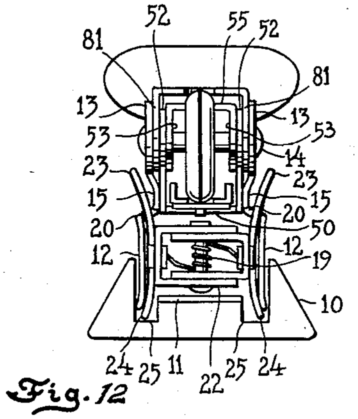
Fig. 12
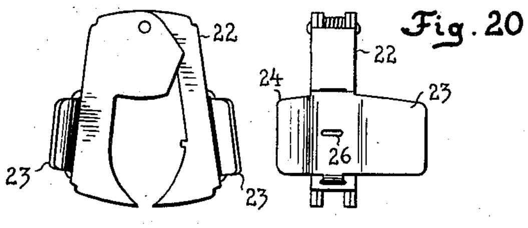
Fig. 20
Fig. 19
INVENTOR:
William G. Pankonin
by John W. Michael
Attorney INVENTOR:
William G. Pankonin
by John W. Michael
Attorney United States Patent Office 2,832,959

Patented May 6, 1958

2,832,959

STAPLING DEVICE

William G. Pankonin, Chicago, Ill., assignor to Triangle Tool & Manufacturing Company, Chicago, Ill., a corporation of Illinois Application August 25, 1955, Serial No. 530,579

14 Claims. (Cl. 1—3)

This invention relates to improvements in a stapling device, particularly the hand operated desk type, using preformed staples and usable also as a tacker.

One object of this invention is to provide such device with a staple pusher mechanism normally engaged with the staple magazine when in loading position and readily disengaged and separated from such magazine for cleaning, repairing and replacement.

Another object of this invention is to provide such device with a staple pusher which may be readily and inexpensively constructed from two separately easily manufactured parts quickly united to form a unit.

Another object of this invention is to provide such device with a support for the staple driving arm return spring which is easily made and assembled to provide adequate strength and good clearance for the staple pusher mechanism.

Another object of this invention is to provide such device with a single mounting for the staple driving arm and magazine which provides separate adequate guides for both such elements thereby assuring accurate alinement.

Another object of this invention is to provide such device with an interlock between the staple driving arm and magazine providing limited relative swinging movement therebetween which can be easily released to swing these parts apart for inspection, repair and removal of jammed staples.

Another object of this invention is to provide such device with a base and an easily adjustable anvil which is quickly and simply assembled and disassembled and so associated with the base that papers and the like to be stapled may be properly guided onto such anvil.

Another object of this invention is to provie such device with a staple driving blade carried by the staple driving arm and related to the handle thereon so as to be removed by a simple swinging action.

Another object of this invention is to provide such device with a staple driving arm and handle which removably receive and hold a readily visible identification strip.

Another object of this invention is to provide such device with a base and anvil support which hold a readily visible identification strip.

Another object of this invention is to provide such device with a base in which is detachably carried a plier-type remover for clinched staples so as not to interfere with the use of the device for driving and clinching staples and for driving staples as a tacker.

Another object of this invention is to provide such device with a base in which there is detachably carried a staple lifter of the lever type arranged so as not to interfere with the dual use of such device and capable of being carried by such base simultaneously with a staple remover of the plier type.

A still further object of this invention is to provide a remover for staples driven with legs unclinched into material which grips the bridge of the staple during the lifting to insure that both legs will be evenly withdrawn.

These objects are obtained by the stapling device hereinafter described and illustrated in the accompanying drawings, in which:

Fig. 1 is a view in side elevation of a stapling device embodying the present invention with a part broken away and shown in section;

Fig. 2 is a fragmentary sectional view taken on the longitudinal axis of the right-hand end of the device viewed in Fig. 1, the staple pusher mechanism being withdrawn from the loading end of the magazine and the remover withdrawn;

Fig. 3 is a view in side elevation of the staple pusher mechanism separated from the magazine;

Fig. 4 is a left-hand end view of the staple pusher mechanism viewed in Fig. 3;

Fig. 5 is a view in side elevation of the staple driving blade;

Fig. 6 is a fragmentary sectional view taken on the longitudinal axis of the left-hand end of the staple driving arm illustrating the method of removably holding the staple driving blade to such arm;

Fig. 12 is a view in right-hand end elevation of the stapling device shown in Fig. 1;

Fig. 13 is a top plan view of a transparent handle on the staple driving arm embodying means for removably receiving an identification card;

Fig. 14 is a longitudinal sectional view of such handle removed from such arm;

Fig. 15 is a sectional view taken on the line 15—15 of Fig. 13;

Fig. 16 is a bottom plan view of the handle and arm of Fig. 13;

Fig. 17 is a view in side elevation of a base for the stapling device embodying means for holding an identification card;

Fig. 18 is a top plan view of the base of Fig. 17;

Fig. 19 is a view in side elevation of a cooperable jaw remover for staples the legs of which are clinched, such remover being removably carried at the right-hand end of the staple carrying device of Fig. 1;

Fig. 20 is a view in side elevation of the staple remover of Fig. 19;

Figures 7, 8, 9, 10, 11:
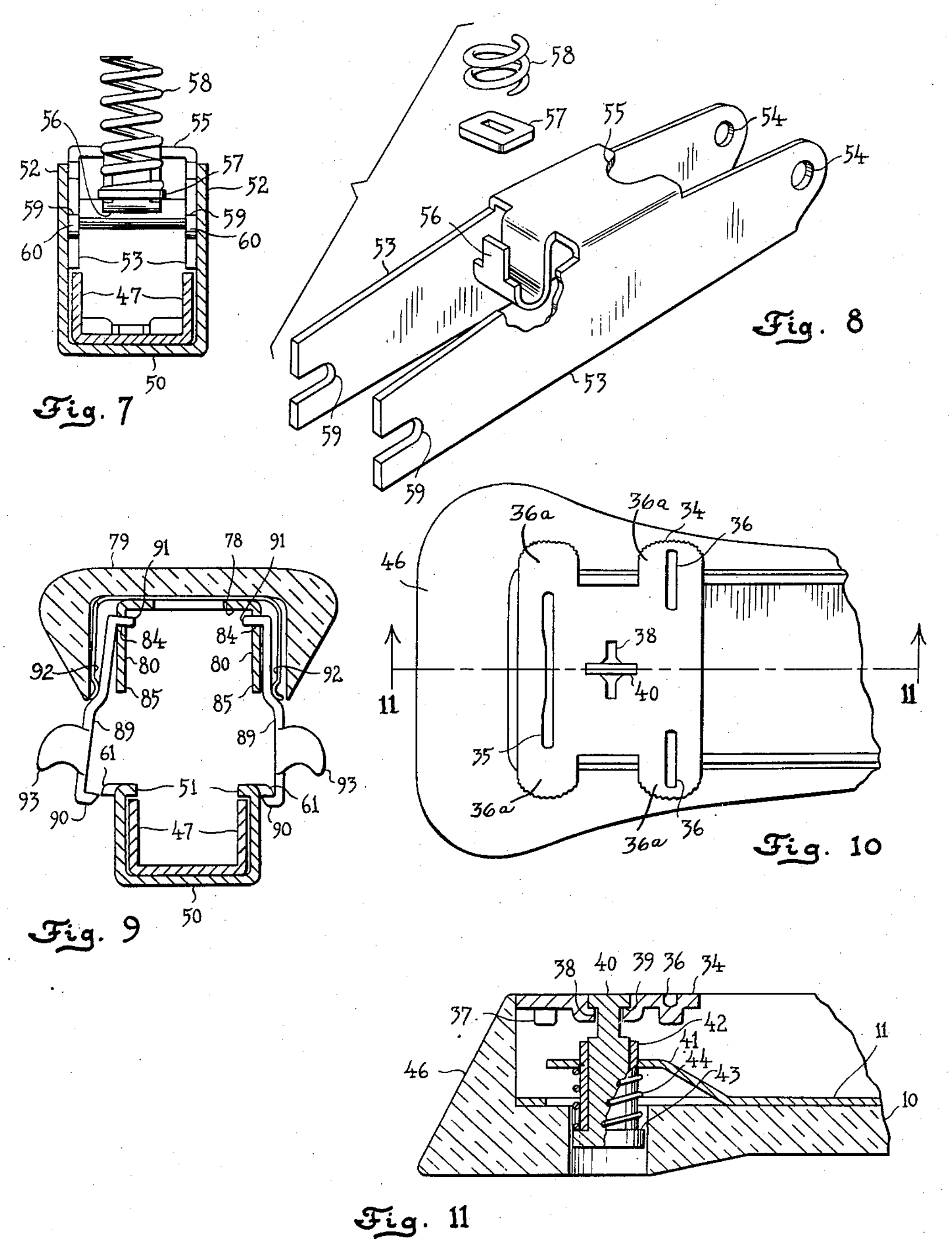
Fig. 7 is a fragmentary transverse sectional view taken through the end of the staple driving arm and magazine immediately to the left of the mounting for the return spring for the staple driving arm, the arm and magazine being removed from the base.
Fig. 8 is a perspective view of the mount for the staple driving arm return spring.
Fig. 9 is an enlarged fragmentary sectional view taken on the line 9—9 of Fig. 1 with the staple pusher mechanism withdrawn.
Fig. 10 is an enlarged fragmentary view in top elevation of the left-hand end of the base, showing the adjustable anvil.
Fig. 11 is a sectional view taken on the line 11—11 of Fig. 10.

The stapling device illustrated in the drawings is similar in general function and usage to that shown and described in Patent No. 2,311,412 issued to William G. Pankonin on February 16, 1943. The stapling device of this invention embodies improvements in its elements and in their cooperation and, in addition, includes a staple remover and a staple lifter removably carried on the base of the stapling device without interfering with its functioning as clinching device and as a tacking device.

The base of the stapling device comprises a molded lower member 10 which is secured to a metallic frame having a bottom 11 and sides 12. At the right-hand or loading end of the base the sides 12 have upward extensions 13 perforated to receive a pivot 14 on which the staple driving mechanism is pivoted. The extensions 13 midway of their height are provided with inward depressions 15 forming a bearing surface of substantial length for the magazine casing to guide it separately from the action provided by the upper portions of the extensions 13 for the staple driving arm. The magazine and staple driving mechanism are normally maintained in the material reeciving position, shown in Fig. 1, by a riser mechanism including a bridge member 16 (Fig. 2) secured to the base. Such bridge member supports a riser spring 19 above the bottom 11 to provide clearance for the removably carried staple lifter (see Fig. 26). A riser bar 17 has ends slidably guided in slots 18 for limited vertical movement and the spring 19 fits on a depending finger to continuously urge the bar upwardly. The spring 19 may be held on the bridge 16 by a spring engaging tab, while a projection on such bar may enter a hole in casing of the magazine to aid in maintaining proper alinement.

From the rear edge of the extensions 13, slots 20 extend forward in said extensions to receive the long wings 23 of a cooperable jaw staple remover 22, shown in Figs. 19 and 20. This remover functions in general as described in Patent No. 2,033,050 issued to William G. Pankonin on March 3, 1936. It is inserted on its side with its pivoted end forward between the sides 12 from the rear end of the stapling device. The wings 23 project upwardly through the slots 20 outside of the extensions 13 as shown in Fig. 12. The short wings 24 loosely fit in grooves 25 formed in the molded member 10. When the remover 22 is in place, seats 26 in the jaws will be resiliently forced over dimples 21 on the sides 12 to hold the remover in such position. To disengage the remover, the wings 23 are grasped and pressed together to move the seats 26 off the dimples 21. The remover can then be withdrawn for separate usage.

Figure 26:
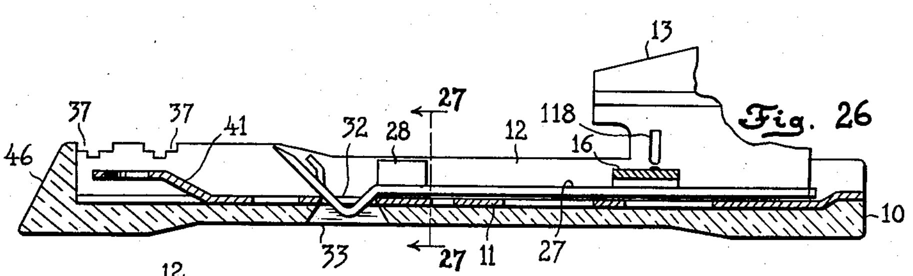
Fig. 26 is a sectional view taken on the longitudinal axis of the base of the stapling device of Fig. 1, illustrating the staple lifter detachably carried in said stapling machine.
Figure 27:
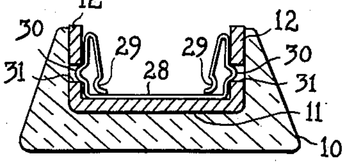
Fig. 27 is a sectional view taken on the line 27—27 of Fig. 26 with the staple lifter withdrawn to illustrate the holding spring.

A lever-type lifter 27 for staples which have been driven into material with the legs unclinched (see Figs. 21 to 25) is also removably carried in the base on the bottom 11. Its handle is inserted under the bridge 16 and its fulcrum seats in alined holes 32 and 33 in the bottom 11 and molded member 10. The staple lifter 27 is detachably held by a spring 28 seated in the base with two inwardly biased arms with seats 29 engaging opposite sides of such lifter. The spring 28 has knobs 30 fitting in holes 31 in the sides 12 to hold it in position. In Fig. 26 the lifter 27 is shown in place. To remove it the exposed end is simultaneously lifted and drawn outwardly to disengage the lifter from the seats 29 and slide it from under the bridge 16. The fulcrum of the lifter will clear the hole 32 during this action. To insert the lifter, its handle is slid under the bridge 16 and its outer end moved downward and inwardly spreading the arms of the spring 28 until its edges rest in the seats 29.

Both the remover 22 and the lifter 27 are mounted so as not to interfere with each other and with the operation of the device as a staple clincher or a tacker. The end of the staple pusher mechanism will clear the body of the remover 22 as the staple magazine and driver are swung to tacking position.

At the forward (left) end of the base there is an adjustable anvil 34 shown in Figs. 10 and 11. This anvil has an elongated cavity 35 for clinching the legs of a staple under its bridge and two separated cavities 36 for individually engaging the legs of the staple and curling them outwardly of its bridge. The desired cavities may be brought in alinement with the staple driving blade by rotating the anvil 34 through 180°. This is accomplished by lifting the anvil against its resilient holding mechanism and turning it. The extending arms 36a (Fig. 10) on the anvil fit in notches 37 formed in the upper edges of the molded member 10 and sides 12; each such notch including a lower part for receiving the projections on the bottom of the anvil 34 beneath the cavities 36. The anvil has a central slot 38 and at 90° thereto a seat 39. The upper head of a key 40 is inserted through the slot 38, turned 90° and lowered into the seat 39. The key 40 is mounted in a tube 42 and both extend upwardly through alined holes in the molded member 10 and bottom 11. A coiled compression spring 44 fits over the tube 42 and rests on a collar 43 on key 40. The tube and key project upwardly through an opening in a formed up holding member 41. The spring 44 presses upwardly against such member to continually urge the key 40 and the anvil 34 downwardly. The collar 43 may be grooved to fit the base of the key 40 so that both will rotate together. The forward end 46 of the molded member 10 slopes upwardly and rearwardly toward the anvil 34 to readily guide papers to the surface of the anvil.

The stapling device herein described includes a staple driving mechanism and a staple magazine, both pivoted to the base on the same pivot 14. The magazine includes a core 47 of U-shaped cross-section, on the upper edges of which staples ride in straddle fashion. At the loading end the core is of less height, as indicated at 48, to make a wider mouth opening for the loading of staples and for the reception of the staple pusher. At the forward end of the core there is an ejection chute of well-known design through which the staple driving blade forces staples from the core 47. The core 47 is carried in a casing 50 which has sides ending in inturned flanges 51 forming upper guides for the staples riding on such core. The inturned flanges 51 terminate at the loading end of the magazine and the sides of the casing 50 have apertured extensions 52 pivotally mounted on the pivot 14. Between the extensions 52 there is positioned a spring mount (see Fig. 8) for the staple driving arm raising spring. This spring mount also provides guides for staples on the core 47 at the loading end. The spring mount consists of a pair of side members 53 apertured at 54 to receive the pivot 14 and joined by a bridge 55. A shouldered tongue 56 projecting from the central part of the bridge 55 supports a rectangular washer 57 and the lower end of a coiled compression spring 58 so that the staple pusher mechanism may slide under such spring and the retaining hooks on the staple pusher may slide by such spring. It will be noted from an inspection of Fig. 8 that the sides of the tongue 56 are spaced inwardly from the sides 53 to provide such clearance. From the forward ends of sides 53 slots 59 open rearwardly and tightly fit on studs 60 secured to the extensions 52. This arrangement provides a very simple means of securing the spring mount in place. The slots 59 are first slid onto the studs 60 and the pivot 14 inserted in the apertures 54 to make the mount a rigid part of the staple magazine. The casing 50 has lips cut therefrom and formed outwardly to provide lugs 61 which provide abutments for the means limiting the movement of the staple driving arm away from the staple magazine in normal operation. The ejection chute end of the casing 50 is provided with a forwardly bent lip 62 which guides the staple driving blade into the ejection chute.

Staples riding on the core 47 are urged forwardly by a staple pusher mechanism which includes a staple pusher having shouldered legs 63 joined by an upper body 64 and spaced to ride on the core 47. The staple pusher also includes a retaining member having a base 65, from the sides of which are upwardly formed two spaced hooks 66 opening rearwardly. A pair of tangs 67 are formed downwardly from opposite ends of the base 65 and fit through openings in the body 64. A rivet 68 unites the retaining member and the staple pusher to form a rigid unit. The tangs 67 are provided with elongated slots 69 which slidably receive a spring carrying rod 72 and permit limited up and down relative movement between the staple pusher and such rod. A spring 70 is secured between the hooks 66 by the rivet 68 passing through the body 65. This spring has upper legs provided with spaced humps 71 which project into hooks 66 to frictionally engage the pivot 14 when seated in such hooks. A coiled compression spring 73 rides on the rod 72 with its outer end in an upwardly and forwardly curved housing 74 of well-known design. The housing at its lower portion has a hook 75 which engages with the outer end of a slot 76 in the casing 50 when the staple pushing mechanism is normally positioned in the magazine. The spring 73 has sufficient force to push the staple pusher in the end of rod 73 and place the last staple in the magazine in the ejection chute.

When the housing 74 is disconnected and withdrawn rearwardly, the staple pusher mechanism will be withdrawn from the magazine until the hooks 66 engage the pivot 14. As this occurs, the spring 70 will be depressed so that humps 71 engage the pivot 14 to hold it in place against the inner curve of such hooks. The staple pushing mechanism may then be swung counterclockwise to the position shown in Fig. 2 to clear the loading end of the staple magazine for the insertion of staples. If it becomes necessary to disengage the staple pusher mechanism as a unity, pressure downwardly and towards the right, as viewed in Fig. 2, will depress the humps 71 and permit the hooks 66 to become disengaged from the pivot 14. The staple pushing mechanism will then be separated from the stapling device. To reconnect the staple pushing mechanism with the stapling device such mechanism is placed in the position shown in Fig. 2 and pulled upwardly and forwardly until the pivot 14 seats into the curve of the hooks to be there held by the humps 71. It should be noted that the spaced hooks 66 slide by the shouldered tongue 56 and spring 58 without interference as the staple pusher is advanced along the magazine toward the ejection chute.

Staples in the magazine alined with the ejection chute are driven through such chute into material and the legs clinched on the anvil 34 by a driving blade 77 (Fig. 5) removably mounted on the forward end of a driving arm 78. This arm is mounted in a molded handle 79 and has sides 80 terminating in rear extensions 81 which are apertured and mounted on the pivot 14. Guides 82 extend downwardly from the sides 80 to ride against the casing 51 and keep the forward end of the staple driving arm in proper alinement. Downward projecting studs 83 on the sides 80 engage the guides 51 of the staple magazine to limit the downward stroke of the staple driving arm relative to the magazine. The sides 80 of the staple driving arm also are provided with elongated slots 84 positioned above downwardly projecting tabs 85 for the purpose of providing a mounting for the limit control members as hereinafter described. At the forward end of the staple driving arm 78 there is a projection 86 which cooperates with a forward overhanging and downwardly turned end 87 and the top of such stapling arm to removably hold the blade 77 in place. The blade 77 has lateral projections forming downwardly facing shoulders engaging the top of the projections 86 to hold up against the underside of the arm 78. To insert or remove the blade it is swung to the position shown in the broken lines in Fig. 6 whence it becomes free of the projections 86. In order to accommodate this swinging motion the inside of the handle 79 is tapered as indicated at 88 and the end 87 bent as shown.

As hereinbefore described, the staple driving arm is normally raised relative to the magazine to the position shown in Fig. 1 by the action of the coiled spring 58. This upper limit is defined by the engagement between the lugs 61 (Fig. 9) and hooks 90 on members 89 swingably secured to the sides 80 by inturned flanges 91 seated in the slots 84. Such members are normally biased inwardly, as illustrated by the right-hand member in Fig. 9, by a U-shaped spring seated within a channel in the molded handle 79 and held therein by the staple driving arm 78. This spring has depending legs 92 which are biased inwardly to press against the outer sides of the members 89 and continually urge them inwardly into locking position. The members 89 have handles 93 which may be manually grasped to pull the hooked ends 90 out of engagement with the lugs 61. When this occurs, the staple driving arm may be swung upwardly away from the magazine to expose the top thereof and to permit substitution of the driving blade 77 and the removal of any staples jammed in the staple magazine. The locking members 89 will automatically snap over the tabs 61 upon swinging the staple driving arm back into the position shown in Fig. 1. When the staple driving arm is depressed to drive a staple, the hooked ends 90 will slide down the sides of casing 50.

In the modification shown in Figs. 13 to 16, inclusive, a molded handle 94, like the handle 79, is made of transparent material and is provided with an undercut channel 95 extending longitudinally inwardly from the right-hand end. Fastenings 96 securing the handle 94 to a staple driving arm 97 are spaced on opposite sides of such channel to keep it open. It is preferable that the staple driving arm 97 have openings 98 in the upper side thereof leading into the channel 95. An index bearing card 99 is inserted from the rear into the channel 95. It is reached from below through the opening 98 to assist in complete insertion or removal.

In the modification shown in Figs. 17 and 18 a molded member 100, like the member 10, is made of transparent material and provided with an upwardly opening channel 101 facing the metal side 102 to form a pocket in which is located an index card **103*a*** visible from the side of the base.

Figures 21, 22, 23, 24, 25:
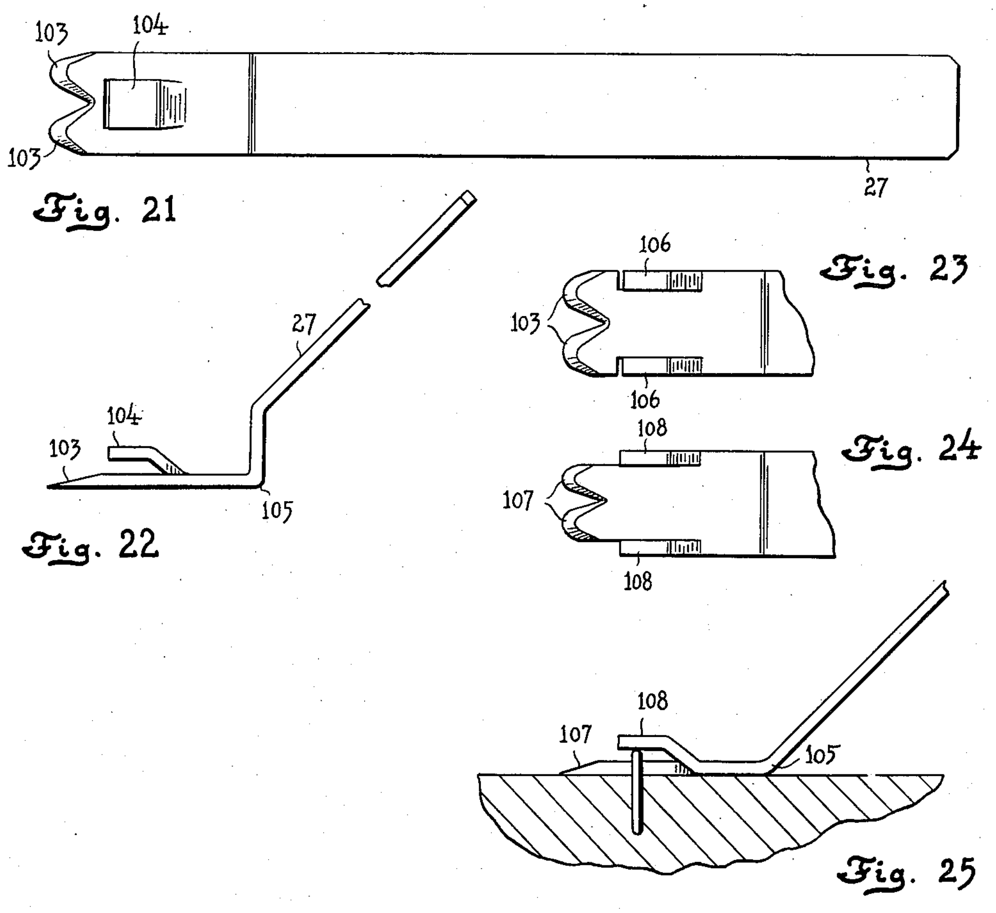
Fig. 21 is a top plan view of a lever-type lifter for staples driven into material with legs unclinched.
Fig. 22 is a view in side elevation of the lifter of Fig. 21.
Fig. 23 is a fragmentary top plan view of a modification of the staple lifter of Fig. 21.
Fig. 24 is a fragmentary top plan view of a second modification of the staple lifter of Fig. 21.
Fig. 25 is a diagrammatic view illustrating the manner in which the staple lifter engages the bridge of the staple to provide for equal withdrawal of both legs thereof.

The staple lifting tool 27 detachably carried in the base of the stapling device and illustrated in Figs. 21 to 25, inclusive, is utilized to lift staples driven into material without clinching of the legs thereof. It is essential with this type of lifting tool to grip the bridge of the staple so that it will not slide lengthwise if there is more drag on one leg than the other. If this happens, only one leg of the staple would be removed. In the staple lifter of this invention the lifting tool, shown in Figs. 21 and 22, has two spaced wedge-like teeth 103 which are easily forced under the bridge of the staple. These teeth also cooperate to engage the head of a tack in the V-notch therebetween. Inwardly of the teeth 103 there is formed up from the body of the lifter 27 a staple bridge engaging portion 104. This portion is spaced to grip the bridge between it and the body of the lifter. A sloping part may be used if the bridge is smaller than usual as the bridge may be gripped by either part of the gripper. Each lifter has a right-angle corner 105 which acts as the fulcrum in the lifting action. In the modification shown in Fig. 23 there are two bridge engaging portions 106 formed on opposite sides of the body. In the modification shown in Fig. 24 the total width of spaced teeth 107 is less than the width of the body and bridge engaging portions 108 are formed from the part of the body extending widthwise beyond such teeth. The illustration in Fig. 25 shows one manner in which the bridge of the staple is engaged by the staple grippers 108 after the teeth 107 have been forced beneath such bridge.

The stapling device can be operated as a hand machine, as a desk type and as a tacker. Its operation is similar to that described in the patent to William G. Pankonin No. 2,311,412. When used as a hand device, the lower member 10 and molded handle 79 are grasped in one hand and squeezed. This forces the driving blade 77 down on a staple contained in the magazine causing it to be driven through the ejection chute and its legs to penetrate the material between such chute and the anvil 34 and be clinched. When the stapling device is used as a desk type, the base rests on a solid platform and pressure is applied downwardly on the molded handle 79 to perform an identical operation. In order to operate the stapling device as a tacker, the lower member 10 is swung away from beneath the staple magazine about the pivot 14 until the ejection chute at the forward end of the magazine is completely exposed and may be placed flatly against a surface into which a staple is to be driven without clinching the legs. Such position is illustrated in the patent to William G. Pankonin No. 2,277,347. After a staple is ejected from the ejection chute and pressure is released on the driving handle 79, it will return to the position shown in Fig. 1 and permit the staple driving mechanism to move the next staple into the ejection chute.

I claim:

1. In a stapling device, a magazine for staples having at the forward end an ejection chute through which the staples are discharged and an entrance at the other end, a forwardly biased staple pusher within said magazine to force the staples along said magazine into alignment with said chute, a pivot at the other end of said magazine, and a hook carried by said staple pusher engageable with said pivot upon withdrawing said pusher from within said magazine to permit said pusher to pivot out of said entrance.

2. In a stapling device, a magazine having means for guiding preformed staples, an ejection chute at the forward end of said magazine through which the staples are driven one by one from said magazine, a staple pusher within said magazine to urge said staples into alignment with said ejection chute, an extension on the rear of said magazine having a pivotal means, and means on said staple pusher engaging said pivotal means when said staple pusher is withdrawn from said magazine, said staple pusher being swingable about said pivotal means out of said magazine.

3. In a stapling device, a staple carrying magazine for guiding preformed staples, said magazine at one end having a discharge chute for the staples, a pusher unit within said magazine to urge said staples along said magazine, a hook carried by said pusher unit, means mounted at the other end of said magazine engaged by said hook upon withdrawal of said pusher unit from said magazine to pivot said pusher unit out of said magazine.

4. In a magazine for preformed staples, a loading end and a discharge end, a staple follower unit in said magazine urging said staples along said magazine to said discharge end, said unit having a part of inverted U-shape following the staples in said magazine, a rod, a spring about said rod and a handle, said magazine at its loading end having pivotal means, said follower unit having a bracket in between said U-shaped part for guiding and supporting said rod, said bracket having means engageable with said pivotal means when said staple follower unit is withdrawn from said magazine to allow said follower unit to swing out and away from said magazine.

5. In a stapling device, a rod, a follower on said rod, a spring coiled about said rod to urge said follower forwardly, a magazine for preformed staples having a loading end and a discharge end, said follower comprising an inverted U-shaped member sliding in said magazine to urge said staples along said magazine, pivotal means mounted on said loading end of said magazine, a part having a tongue projecting into said inverted U-shaped member guided on said rod, a projection on said part engageable with said pivotal means to allow said follower to be detached from said stapling device by pivotal and axial movement of said follower about said projection.

6. In a stapling device, a magazine for preformed staples having a loading end and a discharge end, a staple follower in said magazine to urge said staples along said magazine, a pin on said magazine, means on said follower temporarily engaging said pin to swing said follower out of said magazine, and means causing said follower to normally remain attached to said pin.

7. In a hand operated stapling machine having a magazine for preformed staples, a staple follower in said magazine to move staples therein, said follower having pivotal means, said magazine having means connected thereto engaged by said pivotal means as said staple follower is withdrawn from said magazine to allow said follower to swing out of said magazine and thereafter release said follower from said stapling machine.

8. In a staple magazine having a loading end and a discharge end, a staple follower unit including an inverted U-shaped pusher for urging said staples to said discharge end, a rod, spring means carried by said rod to urge said pusher forwardly, an inverted U-shaped part mounted on said pusher and slidable on said rod, said part having a projection extending through the upper side of said pusher, and means carried by said magazine engaged by said projection when said folower unit is withdrawn from said magazine to prevent said follower unit from being detached from said magazine.

9. In a staple magazine for preformed staples having a loading end and a discharge end, an inverted U-shaped staple pusher in said magazine to push the staples to said discharge end, a rod, a spring coiled about said rod, a unitary part having one end extending down through said pusher and slidable on said rod and another end extending above said pusher to act as a stop to prevent said pusher from being disengaged from said magazine, and a single fastening means mounting said part to said pusher.

10. In a stapling machine, a magazine for preformed staples having a discharge chute at one end and a mounting at the other end, a staple follower unit including an inverted U-shaped pusher which follows the staples in said magazine to urge said staples to said chute, a rod for guiding spring means, spring means on said rod to urge said pusher to said discharge chute, a member mounted on said pusher having one end projecting downward between the walls of said pusher to guide said rod and another end projecting upward from said pusher to engage said mounting when said staple follower unit is withdrawn from said magazine and allow said inverted U-shaped member to turn up and out of said magazine.

11. In a stapling machine, a magazine for preformed staples including pivotal means, a staple pusher in said magazine having a handle and a projection, and locking means associated with said projection, said projection when said pusher is pulled out of said magazine by said handle engaging with said pivotal means to permit said pusher to be swung out of said magazine, said locking means normally retaining said pusher in removed position against reverse rectilinear movement.

12. In a stapling device, a magazine for staples having a core upon which staples ride and an outer member for guiding staples on said core, said outer member having extensions, a member mounted between said extensions and spaced from said core to also guide staples on said core, a pivot connecting said member to said extensions, a staple pusher operable in said magazine, and means on said pusher engaging said pivot when said pusher is withdrawn from said magazine.

13. In a stapling device, a pivot for a staple magazine, a magazine for staples having a core and a casing, said casing being pivoted to said pivot, a member providing a guide for staples on said core, said member having one end secured to said casing and the other end mounted on said pivot, a staple pusher operable in siad magazine, and means on said pusher engaging said pivot when said pusher is withdrawn from said magazine.

14. In a stapling device, a base having extensions, a pivot carried by said extensions, a magazine for staples mounted on said pivot and having at one end a staple ejection chute and at the other end staple loading means, a staple driving arm overlying said magazine and having members within said base extensions pivoted to said pivot, said magazine having arms within said members pivoted to said pivot, a staple pusher operable in said magazine and having means engageable with said pivot, and a staple guiding member overlying said magazine and having portions within said members pivoted to said pivot.

References Cited in the file of this patent

UNITED STATES PATENTS

| | | |
|---|---|---|
| 641,122 | Kruschke | Jan. 9, 1900 |
| 985,135 | Bigelow | Feb. 28, 1911 |
| 1,727,904 | Rokos | Sept. 10, 1929 |
| 1,840,003 | Warden | Jan. 5, 1932 |
| 1,898,678 | Maynard | Feb. 21, 1933 |
| 1,956,174 | Maynard | Apr. 24, 1934 |
| 1,973,846 | Crofoot | Sept. 18, 1934 |
| 2,005,176 | Arbuckle | June 18, 1935 |
| 2,311,412 | Pankonin | Feb. 16, 1943 |
| 2,363,203 | Pankonin | Feb. 29, 1944 |
| 2,489,050 | Ruskins | Nov. 22, 1949 |
| 2,518,485 | Maynard | Aug. 15, 1950 |
| 2,545,262 | Coleman | Mar. 13, 1951 |
| 2,624,878 | Marano | Jan. 13, 1953 |
| 2,670,468 | Marano | Mar. 2, 1954 |
| 2,719,295 | Marano | Oct. 4, 1955 |
| 2,719,296 | Marano | Oct. 4, 1955 |